United States Patent
An et al.

(10) Patent No.: US 7,671,274 B2
(45) Date of Patent: Mar. 2, 2010

(54) ELECTRIC POWER CABLE FIXING APPARATUS FOR AN INSULATOR

(75) Inventors: Byung-Jun An, Incheon (KR); Jeom-Dong An, Incheon (KR)

(73) Assignees: Hyun Cheol Kim (KR); Korea Metal Technology & Management Research Institute (KR)

( * ) Notice: Subject to any disclaimer, the term of this patent is extended or adjusted under 35 U.S.C. 154(b) by 0 days.

(21) Appl. No.: 12/075,623

(22) Filed: Mar. 13, 2008

(65) Prior Publication Data
US 2008/0230265 A1   Sep. 25, 2008

(30) Foreign Application Priority Data
Mar. 14, 2007   (KR) .................. 10-2007-0025205

(51) Int. Cl.
*H02G 7/00* (2006.01)

(52) U.S. Cl. ............... 174/40 CC; 174/40 R; 174/42; 174/168; 174/154; 174/135; 439/460; 248/68.1

(58) Field of Classification Search ............. 174/40 CC, 174/40 R, 42, 45 R, 168, 170, 169, 154, 135, 174/157; 439/460; 248/74.1, 68.1, 316.1; 24/339, 563
See application file for complete search history.

(56) References Cited

U.S. PATENT DOCUMENTS

| | | | | |
|---|---|---|---|---|
| 1,905,967 A | * | 4/1933 | Milne | ............... 248/63 |
| 3,623,687 A | * | 11/1971 | Nordstrom | ............... 248/74.1 |
| 4,263,478 A | | 4/1981 | Willem | |
| 5,064,971 A | * | 11/1991 | Bogdanow | ............... 174/169 |
| 5,837,943 A | * | 11/1998 | Kellett | ............... 174/169 |
| 6,043,433 A | * | 3/2000 | Schweitzer, Jr. | ............... 174/70 R |
| 6,143,980 A | * | 11/2000 | Blanding | ............... 174/40 CC |
| 6,489,569 B1 | | 12/2002 | Thomson | |
| 6,943,291 B2 | * | 9/2005 | Brittain et al. | ............... 174/42 |
| 7,201,352 B2 | * | 4/2007 | Kawai | ............... 248/74.1 |

* cited by examiner

*Primary Examiner*—Dhiru R Patel
(74) *Attorney, Agent, or Firm*—Blakely, Sokoloff, Taylor & Zafman

(57) ABSTRACT

An apparatus fixing a power cable to an insulator, which clamps the head of the insulator to fix the power cable to an insulator head, easily and firmly. To this end, the apparatus includes a main body formed with a vertical through bolt hole in the center, with a space, formed beneath the bolt hole, with a round open bottom which holds the power cable; a fixed clamp formed on one side of the main body with a latch at the bottom to hook the insulator head; a movable clamp formed on the opposite side of the main body with a latch at the bottom to hook the other side of the insulator head; a movable, elastic holding member formed on the space part of the main body, with a groove on the bottom to hold upper part of the power cable; a fixing bolt engaged in the bolt hole of the main body, pressing the elastic holding member by screwing inward, so that the power cable can be fixed between the holding groove on top of the insulator and the holding groove on the bottom of the elastic holding member; and a movable clamp fixing member to fix the movable clamp engaged with the insulator head.

9 Claims, 9 Drawing Sheets

[Fig. 1]
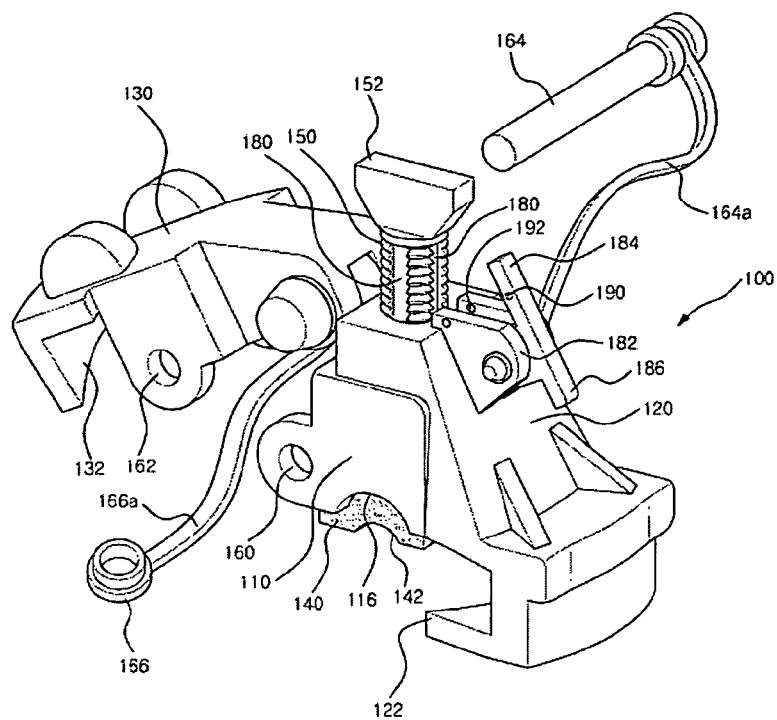
[Fig. 2]
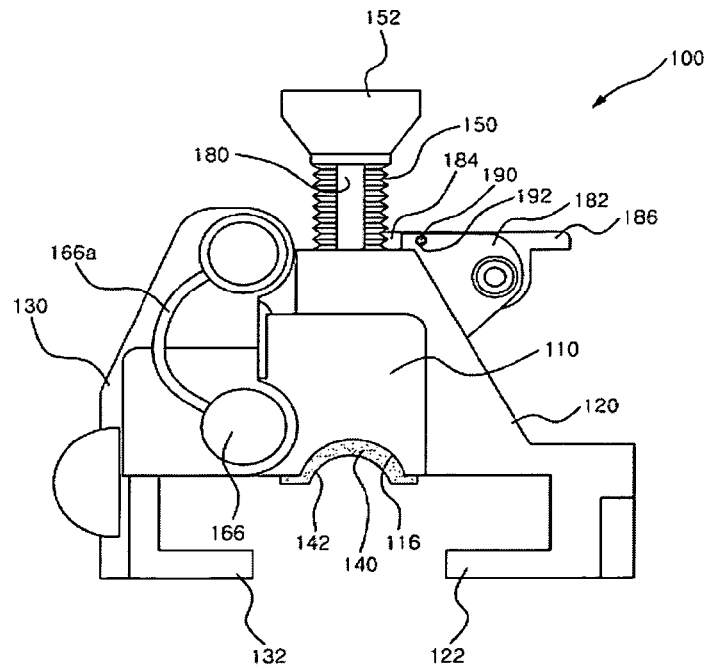

[Fig. 3]
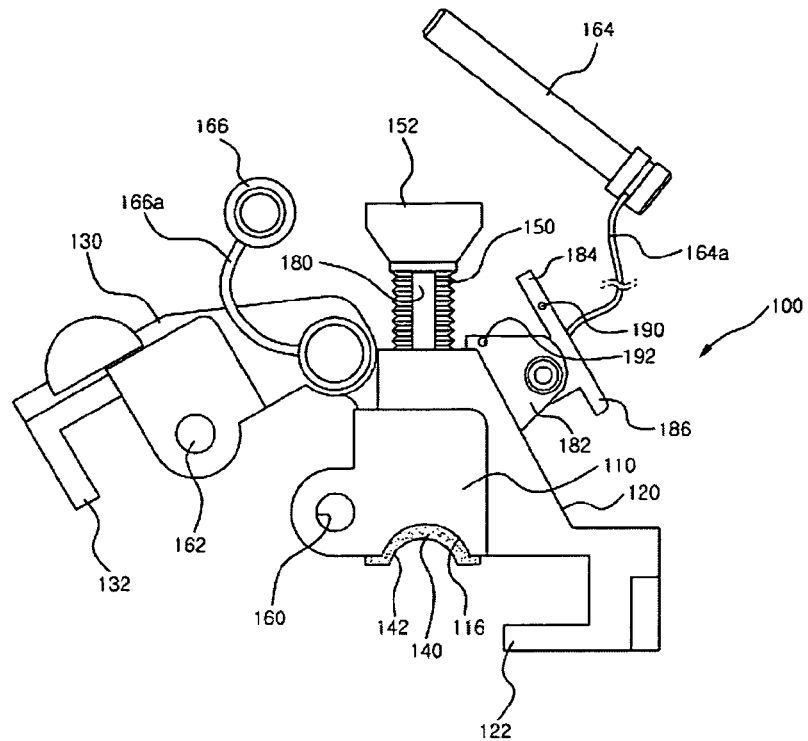
[Fig. 4]
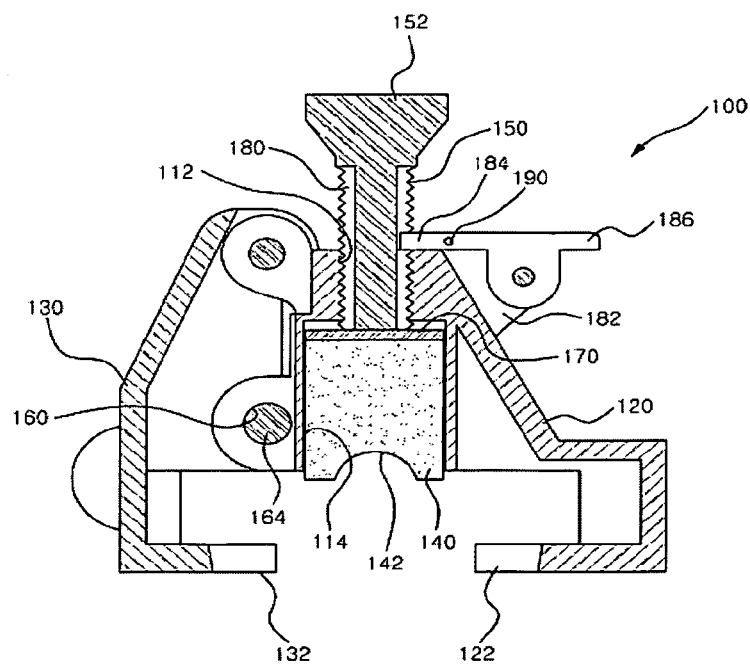

ELECTRIC POWER CABLE FIXING APPARATUS FOR AN INSULATOR

BACKGROUND OF THE INVENTION

This invention relates to a power cable fixing apparatus for insulator, in more detail, an apparatus which can fix power cable on top of an insulator easily and firmly, without limitation in the applicable diameter of the cable, improving the insulation power of the insulator.

In general, the electric power generated in power plants is transmitted through high voltage power line and distributed to end users. Power cables are installed in various ways from power plants to end users, through underground or above ground. The power cables installed above ground are usually installed on poles. According to the method of supporting power cables on poles, the poles are erected at certain intervals to support power cables stably.

The pole and the power cable are electrically insulated with an insulator which is mounted on a support installed on the pole, in order to prevent the electric current from flowing from the power cable to the pole.

In the constitution mentioned above, the insulator is an electrical insulating device installed on a pole to hold the power cable, which are made with ceramics, or composite materials including glass, silicon, and/or EPDM.

The technologies applicable for fixing power cables on insulators have been disclosed in the Korean Patent No. 382322 and 677925. The technology disclosed in the Korean Patent No. 382322 can fix power cables on insulators firmly, protect insulators from physical damage, and applicable without being limited in the diameter of power cable.

However, this technology comprises many parts in complicate structure which leads to higher manufacturing cost and liability to failure, and the work fixing power cable on an insulator is not easy.

The technology disclosed in the Korean Patent No. 677925 provides a relatively simple structure which can fix power cables on insulators by forming a fixing hole in the insulator head and fix cable with a binder wire through the fixing hole in the insulator head.

However, though this technology provides easy workability with simple structure consisted of a fixing hole in the insulator and a binder wire, the fixing power is very weak because power cable is held with a single strand of binder wire and the device may damage the surface of power cable and fittings.

BRIEF SUMMARY OF THE INVENTION

The present invention is created to solve the problems mentioned hereinabove. To this end, this invention provides a power cable fixing apparatus for insulator which can fix power cable on insulator head with a clamping device which latches insulator head pressing power cable between the clamp device and insulator head.

In addition, this invention provides a clamping device which can protect the insulation power of insulator by clamping power cable to insulator with latches and fix power cables with diverse diameter firmly.

In addition, the present invention can prevent corrosion of power cable support base and connector, electric spark by dust, and corona phenomenon, better than binding wire method, by fixing power cable on insulator head with clamping device which clamps and presses power cable to firmly insulator head.

A further advantage of the power cable fixing apparatus for insulator in accordance with this invention is reduced manufacturing cost due to the simple structure using less number of parts, and reduced maintenance cost because the apparatus in accordance with this invention is free from crack and blooming which may occur in the industrial zones subject to higher concentration of ozone and sea shore regions subject to higher salt concentration in the air.

BRIEF DESCRIPTION OF THE SEVERAL VIEWS OR THE DRAWINGS

FIG. 1 is perspective view of the power cable fixing apparatus for insulator in accordance with an exemplary embodiment of the invention.

FIG. 2 is a front view of the power cable fixing apparatus for insulator in accordance with an exemplary embodiment of the invention.

FIG. 3 is a front view of the clamp member of the power cable fixing apparatus for insulator in accordance with an exemplary embodiment of the invention.

FIG. 4 is a cross-sectional view of the power cable fixing apparatus for insulator in accordance with an exemplary embodiment of the invention.

DETAILED DESCRIPTION OF THE INVENTION

Figure 5A:
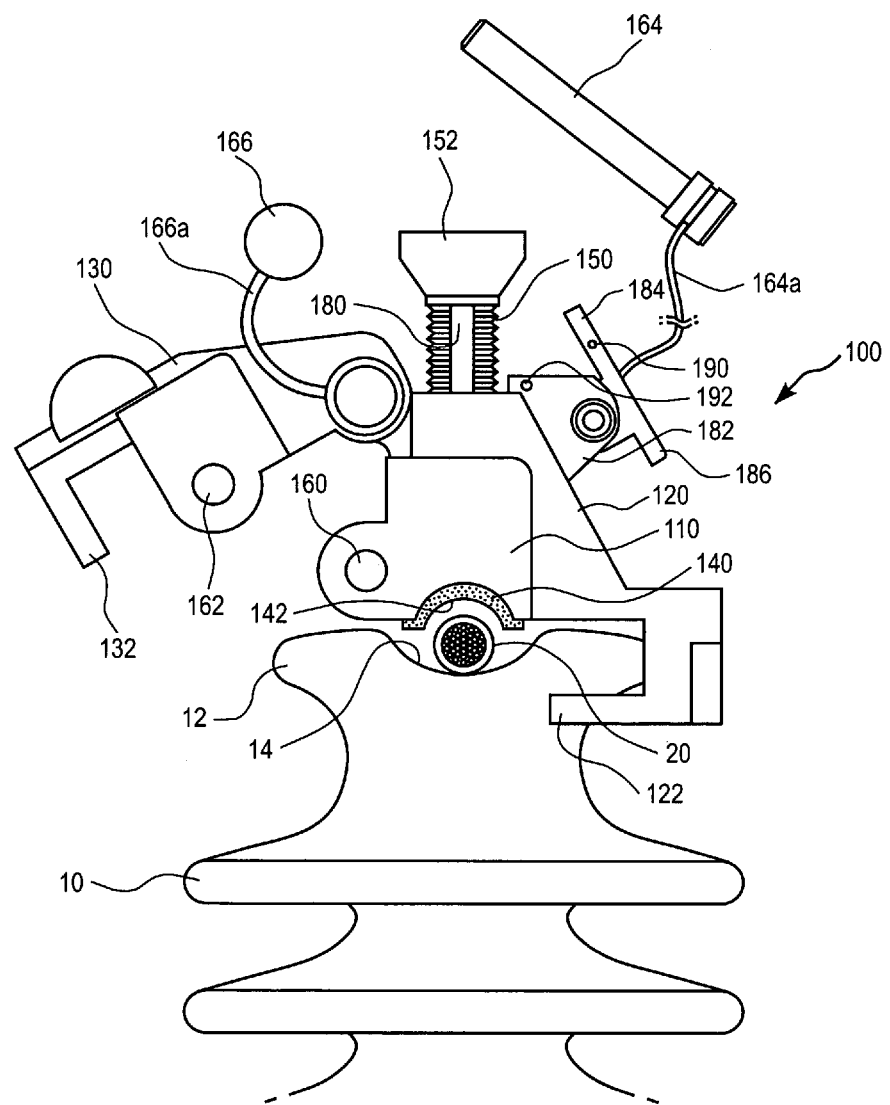
FIG. 5a is a front view of the first process of fixing an insulator to high voltage power line using the power cable fixing apparatus for insulator in accordance with an exemplary embodiment of the invention.

In order to achieve aforementioned purposes, the power cable fixing apparatus for insulator in accordance with this invention comprises; the main body which is formed with a through bolt hole in the center part, and the bolt hole is formed with a space of a certain size and the bottom of the space is open and is formed with round power cable groove; a fixed clamp formed on one side of said main body with a latch at the bottom to hook insulator head; a movable clamp formed on the opposite side of said main body with a latch at the bottom to hook the other side of the insulator head, rotatable in a vertical plane; an elastic holding member formed on the space part of said main body, movable in vertical direction, with a groove on the bottom to hold upper part of power cable; a fixing bolt engaged in the bolt hole of the main body, pressing the elastic holding member by screwing inward, so that the power cable can be fixed between the holding groove on top of the insulator and the holding groove on the bottom of the elastic holding member; and a movable clamp fixing member to fix the movable clamp engaged with the insulator head.

The said movable clamp fixing member is jointed with the pin fixing groove in line using the end of a movable clamp fixing pin which is inserted into pin hole and the fixing pin cap which prevents displacement of said movable clamp fixing pin, and the movable clamp fixing pin and fixing pin cap which are the means of fixing said movable clamp are connected with said main body with a connecting band of a certain length to be prevented from loss. And the apparatus in accordance with this invention also includes a press member made with rigid material, mounted inside the space part on said elastic holding member, movable in vertical direction to press said elastic holding member when said fixing bolt is screwed-in.

In addition, the power cable fixing apparatus for insulator in accordance with this invention can be formed with a means which prevents loosening of said fixing bolt when the fixing bolt presses the elastic holding member which is holding a power cable between the holding groove formed on its bottom and the cable holding groove formed on top of the insulator.

The above mentioned fixing bolt loosening prevention means may comprise; multiple number of key holes formed vertically at certain intervals on the circumference of said fixing bolt; the support members installed at certain intervals on top of said fixed clamp, at front and rear, which is adjacent to said fixing bolt; a fixing bolt loosening prevention key which is installed between said support members, hinge jointed to allow rotation in vertical direction, and its end is inserted into the key hole of said fixing bolt; and an impact projection which is integrated on the rear side of said fixing bolt loosening prevention key to enable to release the fixing bolt loosening prevention key by being hit downward with a tool.

In addition, the said fixing bolt loosening prevention means can be formed with additional means for fixing the fixing bolt loosening prevention key when the loosening of said fixing bolt is prevented by inserting said fixing bolt loosening prevention key into the key hole of the fixing bolt. In such case, said fixing key retaining means can comprise; fixing projections formed on both sides of the end of the fixing bolt loosening prevention key; and the fixing grooves which are formed on the ends of both support members, in correspondence with said fixing projections, to prevent the fixing bolt from loosening with the fixing bolt loosening prevention key inserted into the key holes of the fixing bolt.

Hereinbelow, a preferable embodiment of the power cable fixing apparatus for insulator in accordance with this invention is described in detail with reference to the drawings.

FIG. 1 is a perspective view of the power cable fixing apparatus for insulator in accordance with this invention, FIG. 2 is a front view of the power cable fixing apparatus for insulator in accordance with this invention, FIG. 3 is an exploded view of the clamp member of the power cable fixing apparatus for insulator in accordance with this invention, FIG. 4 is a cross-sectional view of the power cable fixing apparatus for insulator in accordance with this invention.

As illustrated in the FIGS. 1 through 4, the power cable fixing apparatus for insulator (100) in accordance with this invention is characterized by being comprised of; the main body (110) which is formed with a through bolt hole (112) in the center part, and the bolt hole (114) is formed with a space part (114) of a certain size and the bottom of the space is open and is formed with round power cable groove; a fixed clamp (120) formed on one side of said main body (110) with a latch (122) at the bottom to hook insulator (10) head (12); a movable clamp (130) formed on the opposite side of said main body (110) with a latch (132) at the bottom to hook the other side of the insulator (10) head (12), rotatable in a vertical plane; an elastic holding member (140) formed on the space part (114) of said main body (110), movable in vertical direction, with a groove (142) on the bottom to hold upper part of power cable (20); a fixing bolt (150) engaged in the bolt hole (112) of the main body (110), pressing the elastic holding member (140) by screwing inward, so that the power cable (20) can be fixed between the holding groove (14) on top of the insulator (10) and the holding groove (142) on the bottom of the elastic holding member (140); and a movable clamp fixing means to fix the movable clamp (130) engaged with the insulator head (12) when said fixed clamp (120) and movable clamp (130) are installed.

As described hereinabove, the power cable fixing apparatus for insulator in accordance with this invention temporarily fixes power cable (20) in the groove (14) formed on top of insulator (10) head (12) by placing the power cable on the groove, with the main body (110) above the power cable (20), hook the latch (122) of the fixed clamp (120) with one side of the head (12) of the insulator (10), and rotating the movable clamp (130) downward to hook with the other side of the insulator (10) head (12).

As described hereinabove, with the power cable (20) temporarily fixed on the head (12) of the insulator (10) using the fixed clamp (120) and movable clamp (130), fix the movable clamp (130) using said movable clamp fixing means to prevent separation between the latch (132) of the movable clamp (130) and the insulator head (12), and turn the fixing bolt (150) inward so that the elastic holding member (140) presses the power cable in the holding groove (14) on the insulator head (12) for firm fixing.

As described hereinabove, in the course of fixing the power cable (20) in the holding groove (14) of the insulator (10) by turning the fixing bolt (150) inward (downward) so that the elastic holding member (140) presses the power cable (20), because the fixing bolt (150) presses the power cable (20) with the elastic holding member (140) by turning the fixing bolt (150), the insulator (10) is pulled by the latches (122, 132) of the fixed clamp (120) and movable clamp (130), the power cable (20) can be fixed on the head (12) of the insulator (10) more firmly with the power cable fixing apparatus for insulator in accordance with this invention.

In the constitution of the power cable fixing apparatus for insulator (100) in accordance with this invention, the movable clamp fixing means comprises; a pin fixing groove (160) formed on the other side of the main body (110) as a through hole; a pin insert hole (162) formed on side of the movable clamp (130) to correspond with the pin fixing groove (160) when the movable clamp (130) is rotated downward, a movable clamp fixing pin (164) which fixes the movable clamp (130) by being inserted into the pin fixing groove (160) and pin insert hole (162) with the two holes in line; and a fixing pin cap (166) which protects the isolation of the movable clamp fixing pin (164) by being coupled with the end of the movable clamp fixing pin (164) which is inserted into the pin fixing groove (160) and pin insert hole (162).

The movable clamp fixing means constructed in the manner described hereinabove, with the power cable (20) temporarily fixed between the cable holding groove (14) on top of the insulator (10) and the round power cable groove (116) formed on the bottom of the space part (114) of the main body (110) with the latches (122, 132) of the fixed clamp (120) and movable clamp (130), inserts the movable clamp fixing pin (164) into the pin fixing groove (160) and pin insert hole (162) which are aligned, and mount the fixing pin cap (166) on the end of the movable clamp fixing pin (164) with force.

As described hereinabove, with the power cable (20) fixed temporarily on top (12) of the insulator (10) with the latches (122, 132) of the fixed clamp (120) and movable clamp (130), the movable clamp (130) can be fixed by applying the fixing pin cap (166) by forced fitting on the end of the movable clamp fixing pin (164) protruded on front or rear side after jointing the movable clamp fixing pin (164) through the pin fixing groove (160) and pin insert hole (162), without the worry of the movable clamp fixing pin (164) being separated from the insulator (10).

In addition, the movable clamp fixing pin (164) and the fixing pin cap (166) of the movable clamp fixing means are connected with the main body (110) using connector straps (164a, 166a) of a certain length to prevent from loss during transportation or handling, or when the power cable (20) is fixed on the insulator (10). The use of the connector straps (164a, 166a) connecting the movable clamp fixing pin (164) and fixing pin cap (166) with the main body (110) prevent the loss of the movable clamp fixing pin (164) and fixing pin cap (166) and improves the workability of power cable (20) installation.

In addition, the power cable fixing apparatus for insulator in accordance with this invention can be added with a press member (170), made with rigid material, which is positioned in the space part (114) above the elastic holding member (140) and movable, presses the elastic holding member (140) downward by the pressure of the fixing bolt (150). Because this press member (170) is pressed by the turning of the fixing bolt (150) on its center top and presses the elastic holding member (140), connection with the fixing bolt (150) is not required so that the fixing bolt (150) can be rotated.

In other words, the press member (170) formed in accordance with the description hereinabove is not required to be connected with the fixing bolt (150) because it only needs to be able to move up and down, not rotating, because it is pressed down by the rotation of the fixing bolt (150) and in turn presses the elastic holding member (140) downward. Here, the shape of said press member (170) is in correspondence with the shape of the space part (114) of the main body (110) and the dimensions of said press member (170) should be appropriate to press the elastic holding member (140).

The power cable fixing apparatus for insulator in accordance with this invention can be added with a fixing bolt loosening prevention means which prevents the loosening of the fixing bolt (150) when the power cable (20) is fixed between the cable holding groove (114) on the head (12) of insulator (10) and the holding groove (142) formed on the bottom of the elastic holding member (140) and pressed by the fixing bolt (150). This fixing bolt loosening prevention means is very useful for maintaining the fixing power of power cable (20) with the power cable fixing apparatus for insulator in accordance with this invention. Its detail structure and functions will be described later.

The functions and their effects of the said members set forth and described hereinabove are described hereinbelow with reference to respective drawings.

The main body (110) which forms the center part of the power cable fixing apparatus for insulator (100) in accordance with this invention provides a fixing means on its bottom to fix power cable (20) to hold power cable (20) jointly with the power cable groove (14) formed on the head (12) of insulator (10). As illustrated in the FIG. 1 through FIG. 4, the main body (110) is formed with a vertical through bolt hole (112), in its center, and a space part (114) of a certain size, whose bottom is opened and formed with a round power cable groove (116).

The bolt hole (112), space part (114) and power cable groove (116) of the main body (110) formed in accordance with the description hereinabove, which are on the same line, enable vertical movement of the said elastic holding member (140) by the rotation of the fixing bolt (150).

The said fixed clamp (120) whose function is to maintain connection with the insulator (10) head 912) by being hooked with the head (12), as illustrated in the FIG. 1 through FIG. 4, is formed on one side of the main body (110), with a latch (122) inside, in transversal direction, which is hooked with the head (12) of the insulator (10).

The end of the latch (122) of the fixed clamp (120), formed in accordance with the description hereinabove, latch (122) is formed in a curved shape in correspondence with the circumferential curve of the insulator (10), and a space is provided between the bottom of the main body (110) and the latch (122) to enable hooking with the head (12) of the insulator (10). The latch (122) of the fixed clamp (120) hooks the bottom of the insulator head (12) to hold the insulator head (12) between the bottom of the main body (110) and top of the latch (122), so that the side of the insulator head (12) is retained with the latch (122).

The movable clamp (130) which maintains the link with the other side of the insulator (10), as illustrated in the FIG. 1 through FIG. 4, is formed on the other side of the main body (110) where the fixed clamp (130) is formed, which can swing up and sown, with a latch (132), at the end, which is hooked with the insulator head (12). Here, the latch (132) on the end of the movable clamp (130) is opposite to the latch (122) on the end of the said fixed clamp (120).

The latch (132) of the movable clamp (130), formed in accordance with the description hereinabove, also has the end part formed in a curve to match with the circumference of the insulator (10), providing a space where the insulator head (12) is retained, between the bottom of the main body of the movable clamp (130) and the latch (132). The latch (132) of the movable clamp (130) so formed holds the other side of the insulator head (12) with the latch (132) by hooking the bottom of the other side of the insulator head 912) and retaining it between the bottom of the movable clamp (130) main body and top of the latch (132).

The movable clamp (130) is so formed to enable swing up and down, because, if both the fixed clamp (120) and movable clamp (130) are fixed, the insulator head (12) cannot be hooked with the latches (122, 132). In detail, with the movable clamp (130) swung up, hook one side of the insulator head (12) with the latch (122) of the fixed clamp (120), and swing the movable clamp (130) down, then the other side of the insulator head (12) is positioned between the main body of the movable clamp (130) and the latch (132), and the both sides of the insulator head can be latched with both the fixed clamp (120) and movable clamp (130).

In addition, the movable clamp (130) so formed is aligned with the fixed clamp (120). That is, the fixed clamp (120) and movable clamp (130) are on opposite sides across the main body.

As described hereinabove, considering that the insulator head (12) is latched with the latches (122, 132) of the fixed clamp (120) and movable clamp (130) holding power cable, when the movable clamp (130) is swung down on the opposite side to the fixed clamp (120), the distance between the edges of the latches (122, 132) is smaller than the diameter of the insulator head (12).

The elastic holding member (140) retains power cable (20) firmly on top of insulator head (12) by pressing the cable between its bottom and the cable holding groove (14) on top of the insulator head (12) with the force applied by the fixing bolt (150) which will be described later. The elastic holding member (140) is placed in the space (114) of the main body (110), movable up and down, formed with a holding groove (142) matching with the upper part of the power cable on its bottom, and made of an elastic material.

The cable holding groove on the bottom of the elastic holding member (140) formed in accordance with the description hereinabove is formed in round shape to enable to hold power cable regardless of the diameter. The elastic material of the said elastic holding member (140) can be rubber or any other material having elastic physical properties.

The elastic holding member (140) so formed presses and fix the power cable (20) held between its bottom and the holding groove on the insulator top (12) by moving downward by the force exerted by the fixing bolt (15) as it is screwed downward. Here, as described earlier, a press member (170) made with a rigid material is formed in the space (114) of the upper main body (14) of the holding member (140) which presses the elastic holding member (140) downward by the force exerted by the fixing bolt (150). The description set forth earlier on the press member (170) would be enough and not described hereinbelow.

The fixing bolt (150) presses or releases the elastic holding member (140) to fix or release the power cable (20) on the insulator head (12) by turning in clockwise or counterclockwise. As illustrated in the FIG. 1 through FIG. 4, is screwed into the bolt hole (112) of the main body (110), when turned clockwise, presses the elastic holding member (140) to fix the power cable (20) between the holding groove (114) formed on the insulator head (12) and the holding groove (142) on the bottom of the elastic holding member (140).

The fixing bolt (150) formed as described hereinabove presses the elastic holding member (140) to fix the power cable (20) between the holding groove (114) formed on the insulator head (12) and the holding groove (142) on the bottom of the elastic holding member (140) by being turned clockwise.

The fixing bolt (150) formed as described hereinabove is formed with a wide, flat head (152) with which the fixing bolt (150) can be turned easily with fingers. The fixing bolt (150) formed with this flat head (152) can be turned with or without a tool.

The movable clamp fixing means maintains the downswung status of the movable clamp (130) when the power cable (20) is held temporarily on the insulator top (12) using the latches (122. 132) of the fixed clamp (120) and movable clamp (130) assembled with the insulator head (12). As described earlier, the movable clamp fixing means comprises; a pin fixing groove (160) formed on one side of said main body (110); a pin insert hole (162) formed on a side of the movable clamp (130) in correspondence with the pin fixing groove (160); a movable clamp fixing pin (164) which fixes the movable clamp (130) by being inserted through the aligned pin fixing groove (160) and pin insert hole (162); and a fixing pin cap (166) jointed with the end of the movable clamp fixing pin (164) to prevent the movable clamp fixing pin (164) from being separated.

The movable clamp fixing means constructed in the manner described hereinabove, in the course of latching the insulator head (12) with the latches (122, 132) of the fixed clamp (120) and movable clamp (130) by rotating the movable clamp (130) downward, fixes the movable clamp (130) by inserting the movable clamp fixing pin (164) through the pin fixing groove (160) and pin insert hole (162) which are aligned on a straight line, to maintain the fixation of the power cable on the insulator with the movable clamp (130) even when the insulator moves.

The movable clamp fixing pin (164) and fixing pin cap (166) of the said movable clamp fixing means are connected with the main body (110) using connector straps (164, 166a) to prevent loss during transportation, handling, or working with the power cable fixing apparatus for insulator in accordance with this invention.

And, as described earlier, the fixing bolt loosening prevention means added to the power cable fixing apparatus for insulator in accordance with this invention prevents the loosening of the fixing bolt (150) when the fixing bolt (150) exerts the force to fix the power cable (20) between the cable holding groove (114) formed on the insulator top (12) and the cable holding groove (142) formed on the bottom of the elastic holding member (140). As illustrated in the FIG. 1 through FIG. 4, the fixing bolt loosening prevention means is characterized by being comprised of; the key holes (180) formed on the circumference of the fixing bolt (150 in lengthwise direction at certain intervals; the support members (182) formed on the front and rear part of the fixed clamp (120) neighboring with the fixing bolt (150); the fixing bolt loosening prevention key (184) formed between the support members (182) and hinge-jointed to allow up/down swing, inserted into the key hole (180) of the fixing bolt (150) to prevent loosening of the fixing bolt (150); and the impact projection (186) which is formed on the rear side of the fixing bolt loosening prevention key (184) to allow release of the fixing bolt loosening prevention key (184) by being hit with a tool.

The fixing bolt loosening prevention means so formed prevents loosening of the fixing bolt (150) by turning and inserting the fixing bolt loosening prevention key (184) into the key hole (180) on the fixing bolt (150), after fixing power cable on insulator top (12) firmly by fixing the movable clamp (130) with the movable clamp fixing means after latching the insulator with the fixed clamp (120) and movable clamp (130) with the insulator head (12) and locking the fixing bolt (150), as the final process of fixing a power cable on an insulator.

Of course, as described hereinabove, after the completion of the fixation of the power cable (20) on the insulator top (12) by latching the insulator (10) with the fixed clamp (120) and movable clamp (130), fixing the movable clamp (130) and locking the fixing bolt (150), and preventing the loosening of the fixing bolt (150) by rotating and inserting the fixing bolt loosening prevention key (184) into the key hole (180) on the fixing bolt (150), if the power cable fixing apparatus for insulator in accordance with this invention needs to be removed, the fixing bolt (150) can be unlocked by hitting the impact projection (186) on the rear edge of the fixing bolt loosening prevention key (184) downward to isolate the fixing bolt loosening prevention key (184) from the key hole (180).

In addition, the fixing bolt loosening prevention means in accordance with the invention can be added with a means which maintains the fixed status of the fixing bolt loosening prevention key (184), when the power cable fixing apparatus for insulator in accordance with this invention prevents the loosening of the fixing bolt (150) by inserting the fixing bolt loosening prevention key (184) into the key hole (180) of the fixing bolt (150). In this structure, the means which maintains the fixed status of the fixing bolt loosening prevention key (184), as illustrated in the FIG. 1 through FIG. 4, comprises; the fixed projections (190) formed on both sides of the fixing bolt loosening prevention key (184); and the fixing holes (192) which are formed on the end of the two support members (182), coupled with the fixed projections (190) to maintain the status of the fixing bolt loosening prevention key (184), when the loosening of the fixing bolt (150) is prevented by inserting the fixing bolt loosening prevention key (184) into the key hole (180) of the fixing bolt (150).

The fixing key retaining means so formed as described hereinabove maintains the fixed status of the fixing bolt loosening prevention key (184) by coupling the fixing projections (190) formed on both sides of the fixing bolt loosening prevention key (184) with the trough fixing holes (192) formed on the end of the support member (182), in the course of turning and inserting the fixing bolt loosening prevention key (184) into the key hole (180) of the fixing bolt (150) to fix the locked state of the fixing bolt (150). The loosening of the fixing bolt loosening prevention key (184) can be prevented against strong force applied on the insulator (10) by maintaining the fixed status of the fixing bolt loosening prevention key (184) with this fixing key retaining means.

Figure 5B:
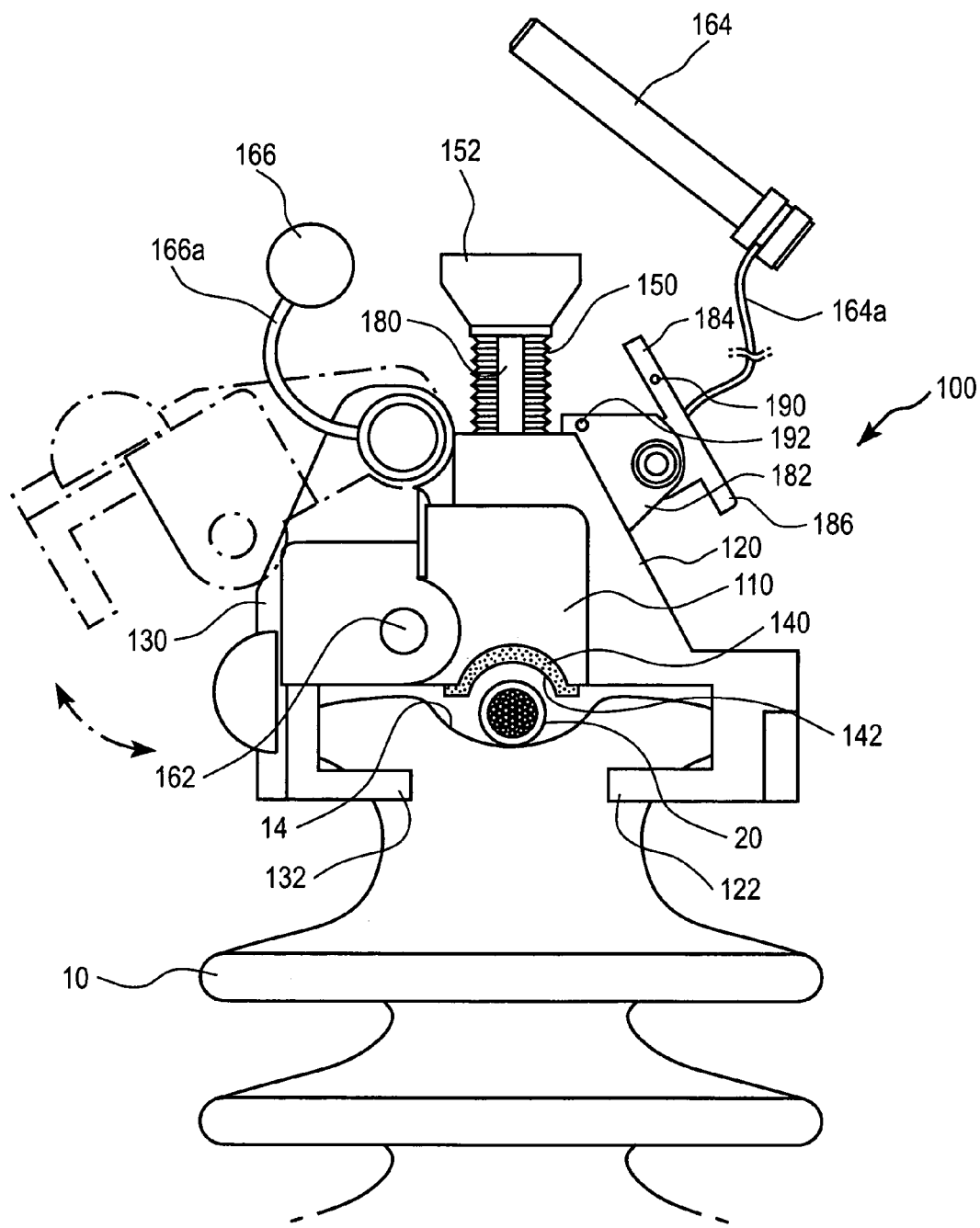
FIG. 5b is a front view of the second process of fixing an insulator to high voltage power line using the power cable fixing apparatus for insulator in accordance with an exemplary embodiment of the invention.
Figure 5C:
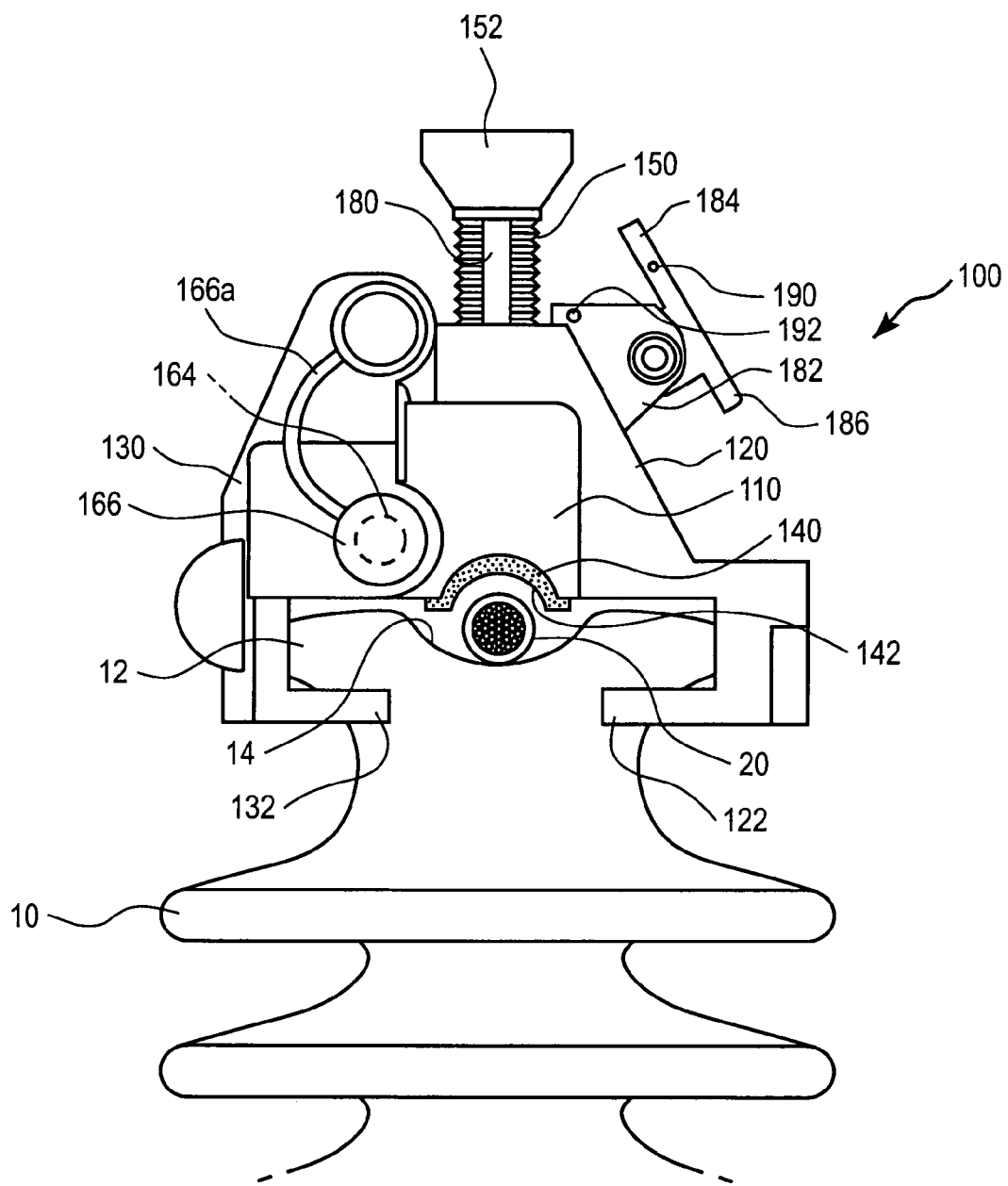
FIG. 5c is a front view of the third process of fixing an insulator to high voltage power line using the power cable fixing apparatus for insulator in accordance with an exemplary embodiment of the invention.
Figure 5D:
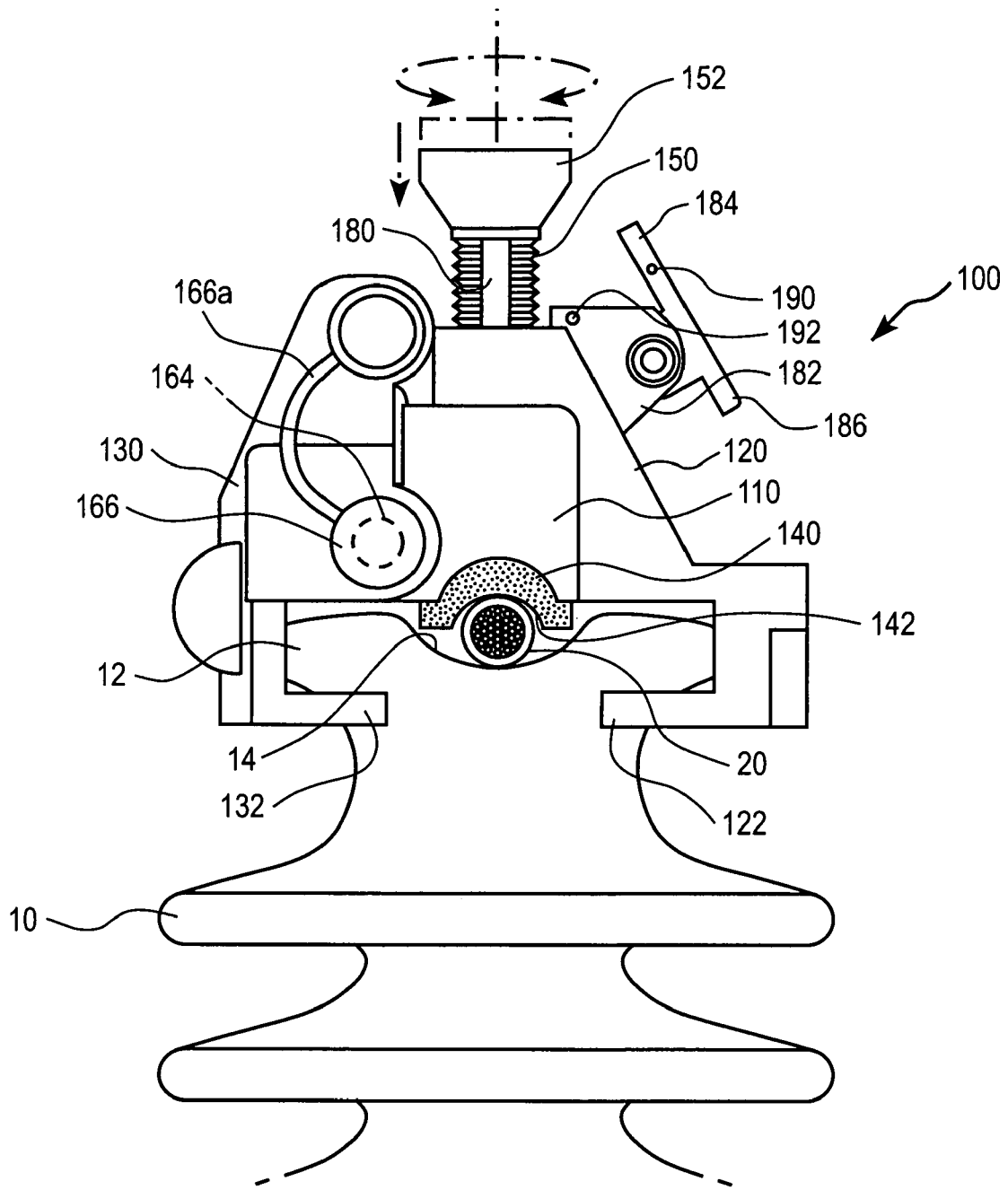
FIG. 5d is a front view of the fourth process of fixing an insulator to high voltage power line using the power cable fixing apparatus for insulator in accordance with an exemplary embodiment of the invention.
Figure 5E:
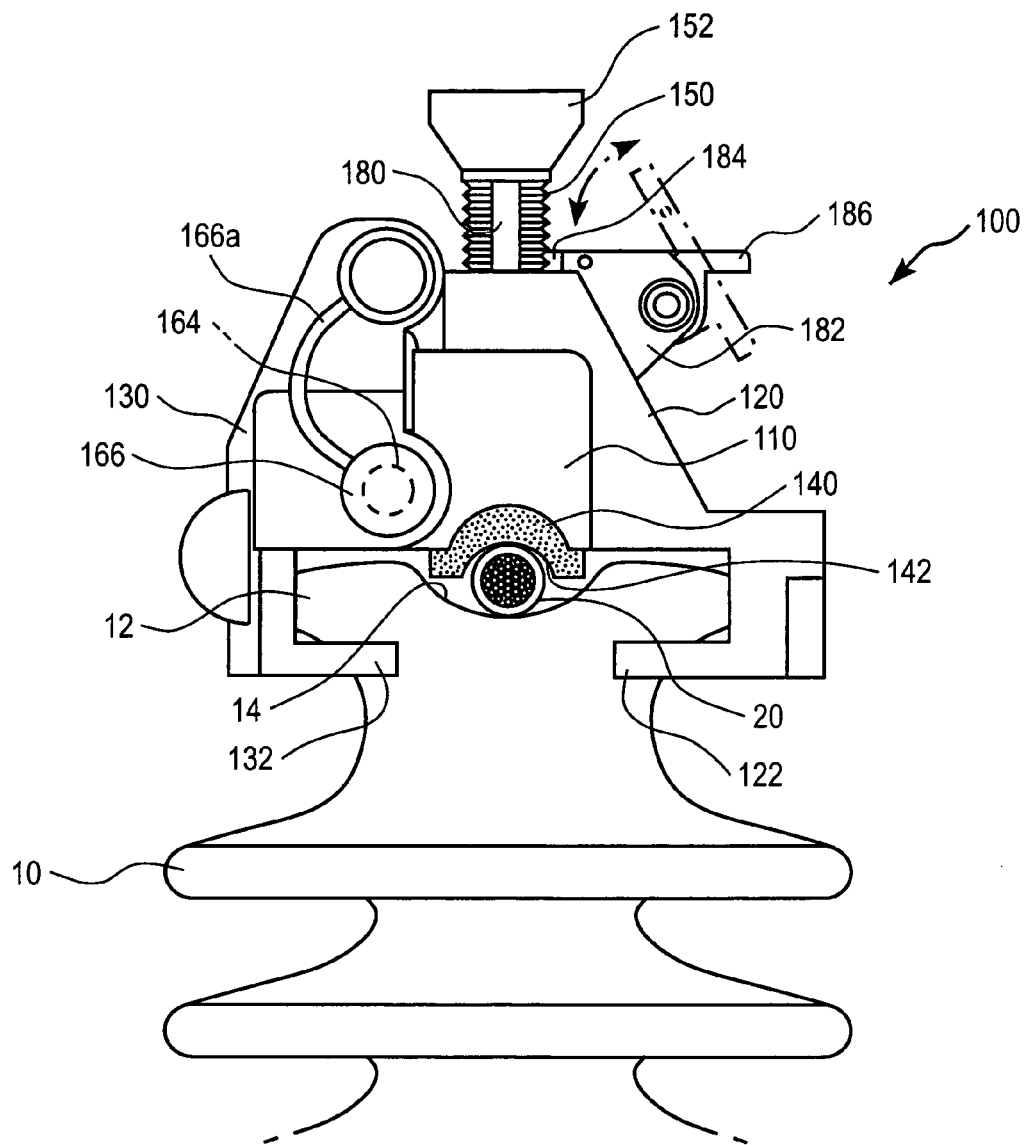
FIG. 5e is a front view of the fifth process of fixing an insulator to high voltage power line using the power cable fixing apparatus for insulator in accordance with an exemplary embodiment of the invention.
Figure 6:
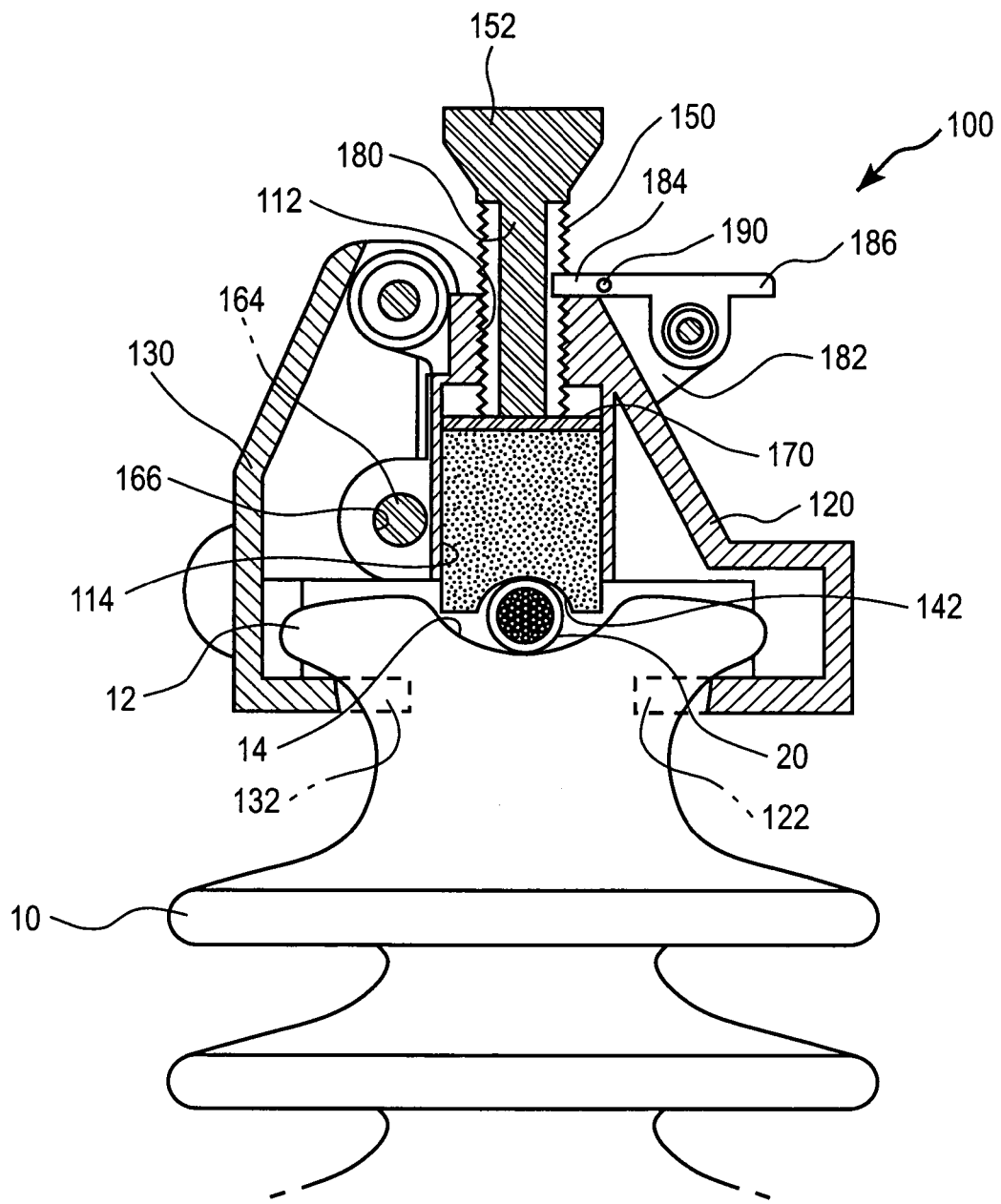
FIG. 6 is a cross-sectional view of the power cable fixing apparatus for insulator in accordance with an exemplary embodiment of the invention fixing a power cable to an insulator.
Figure 7:
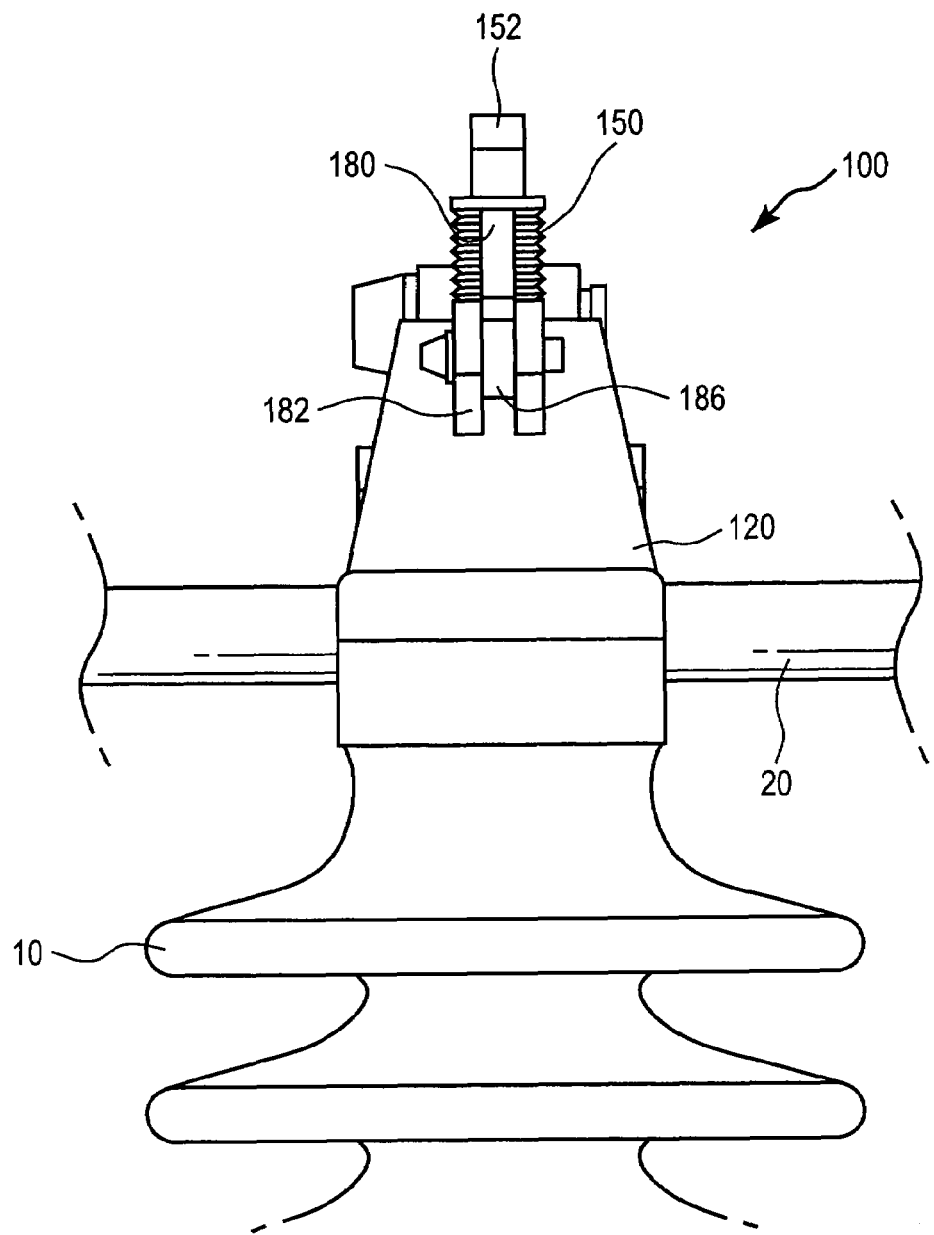
FIG. 7 is a side view of the power cable fixing apparatus for insulator in accordance with an exemplary embodiment of the invention fixing a power cable to an insulator.

FIG. 5a is a front view of the first process of fixing an insulator to high voltage power line using the power cable fixing apparatus for insulator in accordance with the invention. FIG. 5b is a front view of the second process of fixing an insulator to high voltage power line using the power cable fixing apparatus for insulator in accordance with the invention. FIG. 5c is a front view of the third process of fixing an insulator to high voltage power line using the power cable fixing apparatus for insulator in accordance with the invention. FIG. 5d is a front view of the fourth process of fixing an insulator to high voltage power line using the power cable fixing apparatus for insulator in accordance with the invention. FIG. 5e is a front view of the fifth process of fixing an insulator to high voltage power line using the power cable fixing apparatus for insulator in accordance with the invention. FIG. 6 is a cross-sectional view of the power cable fixing apparatus for insulator in accordance with the invention fixing a power cable to an insulator. FIG. 7 is a side view of the power cable fixing apparatus for insulator in accordance with the invention fixing a power cable to an insulator.

The process of fixing an insulator (10) to a power cable (20) using the power cable fixing apparatus for insulator in accordance with this invention is described hereinbelow. Firstly, as illustrated in FIG. 5a, with the round power cable groove (116) formed on the bottom of the space part (114) of the main body (110) placed on the upside of the power cable (20), hook the latch (122) of the fixed clamp (120) with one side of the insulator head (12). At this time, the movable clamp (130) is swung up.

While the insulator head (12) hooked with the latch (122) of the fixed clamp (122) as described above, swing the movable clamp (130) downward, as shown in the FIG. 5b, and hook the insulator head (12) with the latch (132) of the movable clamp (130). At this stage, wherein the insulator head (12) is hooked with the latch (132) of the movable clamp (130), the power cable (20) is temporarily fixed on the insulator top with the fixed clamp (120) and movable clamp (130).

In the state where the power cable (20) is temporarily fixed on the insulator top with the latches (122, 132) of the fixed clamp (120) and movable clamp (130) hooked with the insulator head (12), as described above, as shown in FIG. 5c, insert the movable clamp fixing pin (164) through the aligned pin fixing groove (160) and pin insert hole (162) of the movable clamp fixing means, and lock the movable clamp (130) by mounting the fixing pin cap (166) on the movable clamp fixing pin (164) forcedly.

In this state where the movable clamp (130) is locked by inserting the movable clamp fixing pin (164) through aligned pin fixing groove (160) and pin insert hole (162), as shown in FIG. 5d, turn the fixing bolt (150) downward to push down the elastic holding member (140) via the press member (170), and in turn, press the power cable (20) to fix it firmly on the groove of the insulator head (12). In the said course of pressing and fixing the power cable (20) on the insulator head (12) with the elastic holding member (140) by turning the fixing bolt (150). Because the fixing bolt (150) is rotated clockwise to press the elastic holding member (140) which in turn presses the power cable (20), the insulator is pulled by the latches (122, 132) of the fixed clamp (120) and movable clamp (130), and the power cable (20) can be fixed on the insulator head (12) more firmly with the power cable fixing apparatus for insulator in accordance with this invention.

As described hereinabove, in the state where the power cable (20) is fixed on the insulator head (12) by rotating the fixing bolt (150) clockwise to press the press member (170) and elastic holding member (140), as shown in FIG. 5e, FIG. 6 and FIG. 7, the fixing bolt loosening prevention key (184) is rotated and inserted into the key hole (180) of the fixing bolt (150) to prevent loosening of the fixing bolt (150).

As set forth and described hereinabove, the power cable fixing apparatus for insulator in accordance with this invention which is characterized by being comprised of the main body (110), a fixed clamp (120), a movable clamp (130), an elastic holding member (140), a fixing bolt (150), the movable clamp fixing means and the fixing bolt loosening prevention means can fix a power cable (20) on an insulator head (12) easily and firmly, without limitation in the diameter of the power cable (20).

This invention can be implemented by being modified in various ways without departing from the spirit of this invention.

As described hereinabove, the power cable fixing apparatus for insulator in accordance with this invention provides an easy and effective means for fixing power cables on insulator heads firmly by installing power cables on insulators using clamp device which is hooked with the insulator head.

In addition, the power cable fixing apparatus for insulator in accordance with this invention can protect the insulation power of insulators and can install power cables of diverse diameter, by installing power cables on insulators using clamp device which is hooked with the insulator head.

In addition, another advantage of the power cable fixing apparatus for insulator in accordance with this invention is reduced manufacturing cost by simple structure with reduced number of parts, by providing a power cable fixing apparatus for insulator with a clamping structure which is hooked with insulator head to press power cable.

In addition, the power cable fixing apparatus for insulator in accordance with this invention can prevent electric spark and corona phenomenon caused by dust, and crack and blooming in the industrial areas and sea side areas where the atmosphere has high concentration of ozone or salt, leading to extended service life and reduced maintenance cost.

What is claimed is:

1. A power cable fixing apparatus for an insulator which is characterized by being comprised of:
    a main body which is formed with a through bolt hole in a center part, and a bolt hole is formed with a space part of a certain size and a bottom of the space part is open and is formed with a round power cable groove;
    a fixed clamp formed on one side of said main body with a latch at the bottom to hook an insulator head;
    a movable clamp formed on the opposite side of said main body with a latch, rotatable in a vertical plane, on the bottom to hook the other side of the insulator head;

an elastic holding member, made with an elastic material, formed in the space part of said main body, movable up and down, with a holding groove on the bottom to hold upper part of power cable;

a fixing bolt engaged in the bolt hole of the main body, pressing the elastic holding member by screwing inward, so that the power cable can be fixed between the holding groove on top of the insulator and the holding groove on the bottom of the elastic holding member; and a movable clamp fixing means to fix the movable clamp engaged with the insulator head when the fixed clamp and movable clamp are hooking both sides of the insulator.

2. A power cable fixing apparatus for insulator in accordance with claim 1, wherein said groove on the bottom of the elastic holding member is characterized by being formed in a round shape for firm holding of power cable regardless of the diameter of the power cable.

3. A power cable fixing apparatus for insulator in accordance with claim 1, wherein said movable clamp fixing means is characterized by being comprised of;

a pin fixing hole which is a through hole formed on the one side of said main body, front to rear;

a pin insert hole which is a through hole formed on one side of the movable clamp, front to rear, at the position in line with said pin fixing hole when said movable clamp is swung down;

a movable clamp fixing pin which fixes said movable clamp by being inserted through said pin fixing hole and pin insert hole with the two holes aligned; and a fixing pin holding cap which protects said movable clamp fixing pin by being fitted on the end of said movable clamp fixing pin which is inserted through said pin fixing hole and pin insert hole with the two holes aligned.

4. A power cable fixing apparatus for insulator in accordance with claim 3, wherein said movable clamp fixing pin and fixing pin holding cap are characterized by being connected with said main body using straps of certain lengths to prevent loss.

5. A power cable fixing apparatus for insulator in accordance with any one of claim 1 through claim 4, wherein the power cable fixing apparatus for insulator is characterized by being further formed with a pressing plate member, made with a rigid material, inside the upper part of said space on said elastic holding member, which is movable up and down to press said elastic holding member downward with the force exerted by said fixing bolt.

6. A power cable fixing apparatus for insulator in accordance with claim 5, wherein said power cable fixing apparatus for insulator is further characterizes by being formed with a fixing bolt loosening prevention means which prevents loosening of said fixing bolt when the fixing bolt is pressing said elastic holding member with a power cable held between the grooves formed on the insulator head and the bottom of the elastic holding member.

7. A power cable fixing apparatus for insulator in accordance with claim 6, wherein the fixing bolt loosening prevention means is characterized by being comprised of;

multiple key holes formed on the circumference of said fixing bolt along the length axis at certain intervals;

support members formed on the top of said fixed clamp adjacent to the fixing bolt at front and rear side at certain intervals;

a fixing bolt loosening prevention key formed between said support members, which is hinge-coupled to allow up and down swing to prevent loosening of said fixing bolt by being inserted into the key hole of the fixing bolt; and an impact projection which is formed on the rear end of said fixing bolt loosening prevention key to enable removal of the fixing bolt loosening prevention key by being hit with a tool.

8. A power cable fixing apparatus for insulator in accordance with claim 7, wherein the fixing bolt loosening prevention means is characterized by being further formed with a fixing key retaining means which holds the locking state of the fixing bolt loosening prevention key, when the fixing bolt loosening prevention key prevents the loosening of the fixing bolt by being coupled with the key hole of the fixing bolt.

9. A power cable fixing apparatus for insulator in accordance with claim 8, wherein the fixing key retaining means is characterized by being comprised of;

fixed projections formed on both sides of the end of the fixing bolt loosening prevention key; and fixing holes which are through-formed on the end of said support members, in correspondence with the said fixed projections, to be coupled with the fixed projections when the fixing bolt loosening prevention key is inserted into and coupled with a key hole of the fixing bolt.

\* \* \* \* \*